United States Patent
Schmidt-Kluegmann et al.

(10) Patent No.: US 10,558,637 B2
(45) Date of Patent: Feb. 11, 2020

(54) MODULARIZED DATA DISTRIBUTION PLAN GENERATION

(71) Applicant: SAP SE, Walldorf (DE)

(72) Inventors: Julian Schmidt-Kluegmann, Heidelberg (DE); Simon Elsbrock, Mannheim (DE); Abhay Tiple, St. Leon-Rot (DE); Ioannis Kostis, Heidelberg (DE)

(73) Assignee: SAP SE, Walldorf (DE)

( * ) Notice: Subject to any disclaimer, the term of this patent is extended or adjusted under 35 U.S.C. 154(b) by 404 days.

(21) Appl. No.: 14/972,814

(22) Filed: Dec. 17, 2015

(65) Prior Publication Data

US 2017/0177639 A1 Jun. 22, 2017

(51) Int. Cl.
*G06F 16/22* (2019.01)
*G06F 16/2455* (2019.01)
*G06F 16/27* (2019.01)

(52) U.S. Cl.
CPC .... *G06F 16/2282* (2019.01); *G06F 16/24554* (2019.01); *G06F 16/27* (2019.01)

(58) Field of Classification Search
CPC ......... G06F 17/30584; G06F 17/30575; G06F 17/30339; G06F 9/5083; G06F 16/24554; G06F 16/2282; G06F 16/27; G06F 16/2365; G06F 16/24532; G06F 16/278; G06F 16/24544; G06F 16/24558
See application file for complete search history.

(56) References Cited

U.S. PATENT DOCUMENTS

| | | | | |
|---|---|---|---|---|
| 5,970,495 A | * | 10/1999 | Baru | G06F 9/5088 707/999.01 |
| 9,779,117 B1 | * | 10/2017 | Guo | G06F 17/30292 707/999.003 |
| 2002/0161784 A1 | * | 10/2002 | Tarenskeen | G06F 17/303 707/999.202 |
| 2014/0114924 A1 | * | 4/2014 | Abed | G06F 11/1451 707/675 |
| 2015/0149509 A1 | * | 5/2015 | Leu | G06F 17/30575 707/803 |

(Continued)

FOREIGN PATENT DOCUMENTS

WO 2012/158717 A1 11/2012

OTHER PUBLICATIONS

"Communication: Extended European Search Report", European Patent Office, dated Feb. 27, 2017 (Feb. 27, 2017), for European Application No. 16002588.8, 9pgs.

(Continued)

*Primary Examiner* — Yuk Ting Choi
(74) *Attorney, Agent, or Firm* — Buckley, Maschoff & Talwalkar LLC (57) ABSTRACT

A system includes instantiation of a plan generation environment exposing one or more software hooks, each of the one or more software hooks associated with a respective one of a plurality of steps for generating a database table partition redistribution plan, identification, for of the one or more software hooks, of an associated one or more software modules for performing the step associated with the at least one software hook, and execution of the plan generation environment and the identified one or more software modules to generate a database table partition redistribution plan.

11 Claims, 7 Drawing Sheets

(56) References Cited

U.S. PATENT DOCUMENTS

2015/0149513 A1* 5/2015 Beigel ............... G06F 17/30339
 707/809
2015/0199404 A1* 7/2015 Elias .................. G06F 16/2453
 707/718
2016/0147818 A1* 5/2016 Schefe ............. G06F 17/30575
 707/648

OTHER PUBLICATIONS

"SAP HANA Data Warehousing Foundation 1.0 SPS 02—Data Distribution Optimizer Administration Guide", Sep. 28, 2015 (Sep. 28, 2015), XP55346764, 58pgs., Retrieved from the Internet:URL:https://help.sap.com/viewer/product/SAP_HANA_DATA_WAREHOUSING_FOUNDATION/1.0.5.0/en-US, retrieved on Feb. 16, 2017.

Anonymous: "IBM DB2 10.1—Partitioning and Clustering Guide", Jan. 1, 2013 (Jan. 1, 2013), XP55346864, Retrieved from the Internet:URL:http://froebe.net/blog/wp-content/uploads/2013/09/DB2-10.1-LUW-Partitioning-and-Mistering-Guide-IBM-Inc.pdf, retrieved on Feb. 16, 2017, (cover sheets 14pgs. + 1- 226, 240pgs.)—(Part 1).

Anonymous: "IBM DB2 10.1—Partitioning and Clustering Guide", Jan. 1, 2013 (Jan. 1, 2013), XP55346864, Retrieved from the Internet:URL:http://froebe.net/blog/wp-content/uploads/2013/09/DB2-10.1-LUW-Partitioning-and-Mistering-Guide-IBM-Inc.pdf, retrieved on Feb. 16, 2017, (pp. 227-426, 239pgs.)—(Part 2).

Wagner, Stefan et al., "Benefits of Plugin-Based Heuristic Optimization Software Systems", Computer Aided Systems Theory, Eurocast, Jan. 1, 2007, 8 pp.

"Summons to attend oral proceedings pursuant to Rule 115(1) EPC", European Patent Office, Jan. 31, 2019, for European Application No. 16002588.8, 8 pp.

* cited by examiner

| Generate New Plan | |
|---|---|
| Select Profile | DDOSplitRedistBalance /Jul 10, 2015; 1:29:52 PM |

410

General

| Configuration ID | 79 / INITIAL CONF |
|---|---|

Dataset Determination

| | ☐ #(0) | Available Items In Total: 86 |
|---|---|---|
| Schema name(s) | ☐ | BACKUP_OPERATOR |
| | ☐ | C5224874 |
| | ☐ | SCHEMA_NAME1 |
| | ☐ | BW_USER |

| | ☐ #(0) | Available Items In Total: 18 |
|---|---|---|
| Group name(s) | ☐ | BAR |
| | ☐ | BW1 |
| | ☐ | DIN_GROUP |
| | ☐ | FOO |

| | ☐ #(0) | Available Items In Total: 10 |
|---|---|---|
| Group type(s) | ☐ | BW |
| | ☐ | BW_DSO |
| | ☐ | DIN_GROUP |
| | ☐ | GROUP_TYPE1 |

| External estimates schema name (optional) | Enter a search query |
|---|---|
| External estimates table name (optional) | Enter a search query |
| Report tables skipped due to partially-loaded groups | ☐ |

Stop Conditions

| Node deviation threshold (optional) | |
|---|---|
| Number of step groups (optional) | |

Number of Partitions

| Do not decrease the number of partitions | ☐ |
|---|---|

Distribution

| Placement strategy | Identically-numbered partitions on same host |
|---|---|
| Laziness Threshold | 1 |

420

[ Generate Plan ]   [ Cancel ]

MODULARIZED DATA DISTRIBUTION PLAN GENERATION

BACKGROUND

An enterprise database system stores vast amounts of data received from one or more different sources. The data is stored in database tables and may be accessed and modified via structured queries. The database tables may be partitioned, and many database systems support the distribution of table partitions across multiple hosts in order to improve, for example, scalability and availability.

The distribution of table partitions across hosts is typically determined by a plan generation algorithm. The plan generation algorithm may take into account different properties of the landscape and data access needs. Conventional plan generation algorithms are provided by a database system developer and are not capable of the flexibility required to account for the multitude of possible considerations and their relative importance to various users.

DETAILED DESCRIPTION

The following description is provided to enable any person in the art to make and use the described embodiments. Various modifications, however, will remain readily apparent to those in the art.

Figure 1:
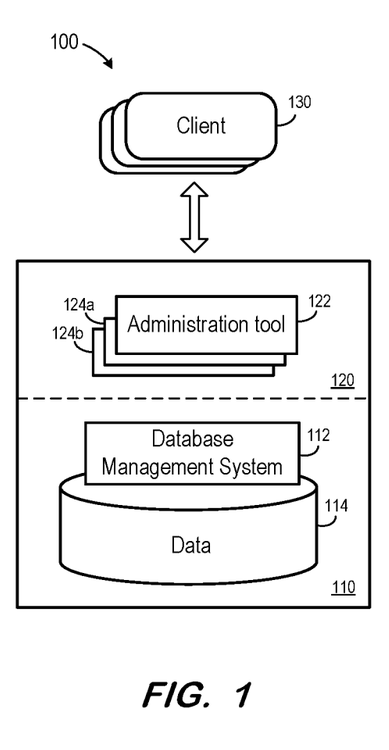
FIG. 1 is a block diagram of a database architecture according to some embodiments.

FIG. 1 is a block diagram of database architecture 100 according to some embodiments. Embodiments are not limited to architecture 100 or to a database architecture. Architecture 100 includes database 110, application server 120 and clients 130.

Application server 120 executes and provides services to applications such as administration tool 122 and other applications 124a and 124b. Applications may comprise server-side executable program code (e.g., compiled code, scripts, etc.) which provide functionality to clients 130 by providing user interfaces to clients 130, receiving requests from clients 130 via such user interfaces, retrieving data from database 110 based on the requests, processing the data received from database 110, and providing the processed data to clients 130.

Applications executing within application server 120 such as administration tool 122 may also expose administrative functions to clients 130, including but not limited to database configuration, database maintenance, database optimization, and other administrative functions. Access of a client 130 to particular applications may be based on a role of a user operating the client 130. For example, only users associated with a database administrator role may be permitted to access administration tool 122 in some embodiments.

Application server 120 provides any suitable interfaces through which clients 130 may communicate with applications executing on application server 120. For example, application server 120 may include a HyperText Transfer Protocol (HTTP) interface supporting a transient request/response protocol over Transmission Control Protocol (TCP), a WebSocket interface supporting non-transient full-duplex communications between application server 120 and any clients 130 which implement the WebSocket protocol over a single TCP connection, and/or an Open Data Protocol (OData) interface.

Database 110 comprises database management system (DBMS) 112 and data 114. According to some embodiments, data 114 includes data of database tables. Data 114 may be distributed among multiple hosts as is known in the art. For example, each host may include one or more partitions, and each partition may store one or more associated database tables of data 114.

As will be described below, DBMS 112 may provide a plan generation engine to generate redistribution plans according to some embodiments. DBMS 112 may execute such a redistribution plan in order to distribute data 114 among the multiple hosts.

The distribution of data 114 among hosts and definitions of partitions may be described by metadata which is also stored within data 114. Stored metadata may also describe the structure, relationships and meaning of the data stored within data 114. This information may include data defining the schema of database tables stored within data 114. The schema may specify the namespace to which the database tables belong, database table names, columns of the database tables, the data type associated with each column, and other information associated with the database tables.

One or more applications executing on server 120 may communicate with DBMS 112 using database management interfaces such as, but not limited to, Open Database Connectivity (ODBC) and Java Database Connectivity (JDBC) interfaces. These types of applications may use Structured Query Language (SQL) to manage, modify and query data stored in database 110.

DBMS 112 serves requests to retrieve and/or modify data 114, and also performs administrative and management functions. Such functions may include snapshot and backup management, indexing, optimization, garbage collection, and/or any other database functions that are or become known. Database 110 may also provide application logic, such as database procedures and/or calculations, according to some embodiments. This application logic may comprise scripts, functional libraries and/or compiled program code.

In some embodiments, data 114 may comprise one or more of conventional tabular data, row-based data, column-based data, and object-based data. Data 114 may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may comprise any query-responsive data source or sources that are or become known, including but not limited to a SQL relational database management system. Database 110 may comprise a relational database, a multi-dimensional database, an eXtendable Markup Language (XML) document, or any other data storage system storing structured and/or unstructured data. Data 114 may be distributed among several relational databases, dimensional databases, and/or other data sources. Embodiments are not limited to any number or types of data sources.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As indicated by a dashed line, application server 120 may be separated from or closely integrated with database 110. A closely-integrated application server 120 may enable execution of server applications completely on database 110, without the need for an additional application server. For example, according to some embodiments, database 110 includes a comprehensive set of embedded services which provide end-to-end support for Web-based applications. The services may include a lightweight web server, configurable support for OData, server-side JavaScript execution and access to SQL and SQLScript.

Each of clients 130 may comprise one or more devices executing program code of a software application for presenting user interfaces to allow interaction with application server 120. The user interfaces may comprise user interfaces suited for administration, reporting, data analysis, and/or any other functions based on data 114.

Presentation of a user interface as described herein may comprise any degree or type of rendering, depending on the type of user interface code generated by application server 120. For example, a client 130 may execute a Web Browser to request and receive a Web page (e.g., in HTML format) from application server 120 via HTTP, HTTPS, and/or WebSocket, and may render and present the Web page according to known protocols. One or more of clients 130 may also or alternatively present user interfaces by executing a standalone executable file (e.g., an .exe file) or code (e.g., a JAVA applet) within a virtual machine.

Figure 2:
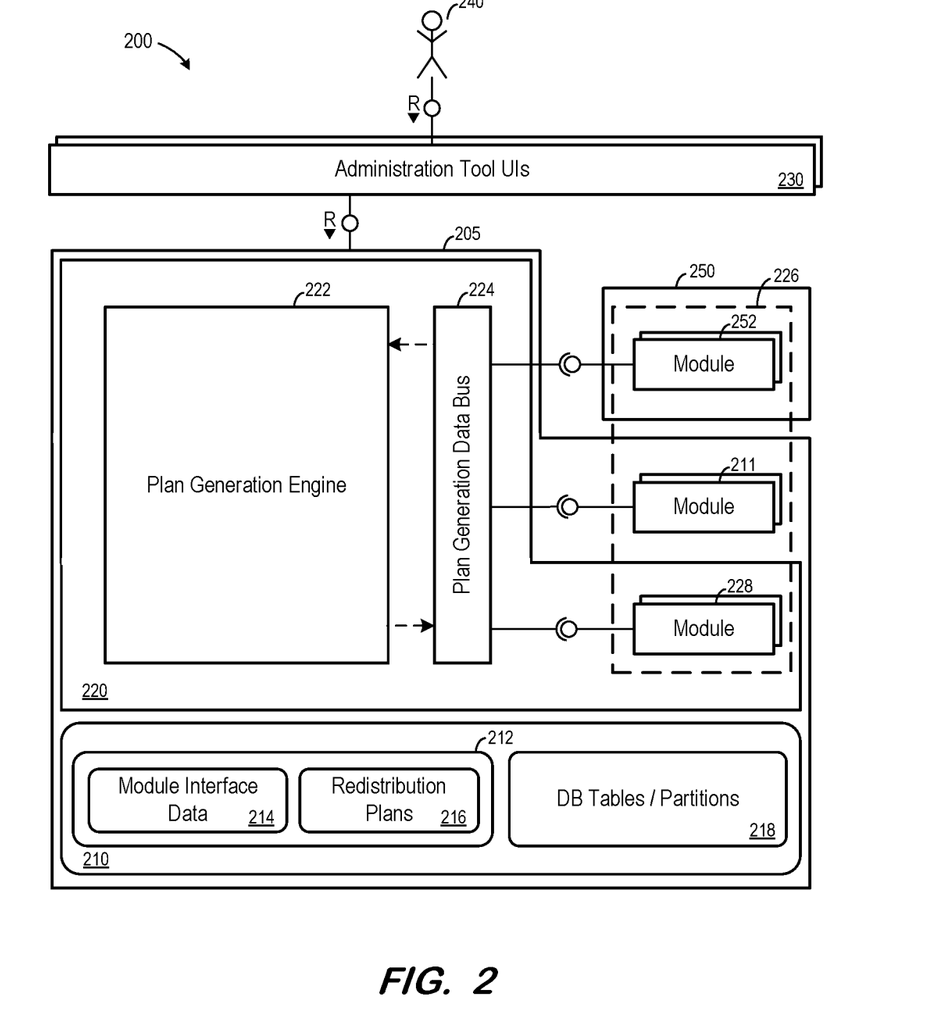
FIG. 2 is a block diagram of a database architecture according to some embodiments.

FIG. 2 is a detailed block diagram of system 200 according to some embodiments. System 200 may comprise an implementation of system 100 of FIG. 1 in some embodiments. System 200 includes database 205, which in turn includes data 210 and database engine 220. System 200 also includes administration tool UI components 230, with which database administrator 240 interacts to generate redistribution plans according to some embodiments.

Plan generation engine 222 is invoked in order to generate a redistribution plan. Plan generation engine 222 of database engine 220 may generate redistribution plans based on algorithms received via plan generation data bus 224 from plan generation step modules 226. Modules 226 may include algorithms which are plugged into software hooks of plan generation engine 222 and called at appropriate times during generation of a redistribution plan.

Modules 226 may be implemented within the core of database system 205 (e.g., as SQLScript modules 211), on database engine 220 (e.g., as JavaScript modules 228), and/or on external system 250 to which a communication channel can be established as modules 252. Modules 226 may therefore provide a mechanism by which a customer might implement a customer-specific algorithm which is called during generation of a redistribution plan as an alternative to an algorithm shipped by a provider of database system 205.

Data 210 includes repository 212 and tables 218. Module interface data 214 of repository 212 includes plan generation environments (e.g., metadata of module interfaces, and configuration settings (e.g., which modules are to be used)) and logs generated during the generation of redistribution plans 216. Redistribution plans 216 define the number of database table partitions and their placement, and can be triggered for execution by database 205.

Figure 3:
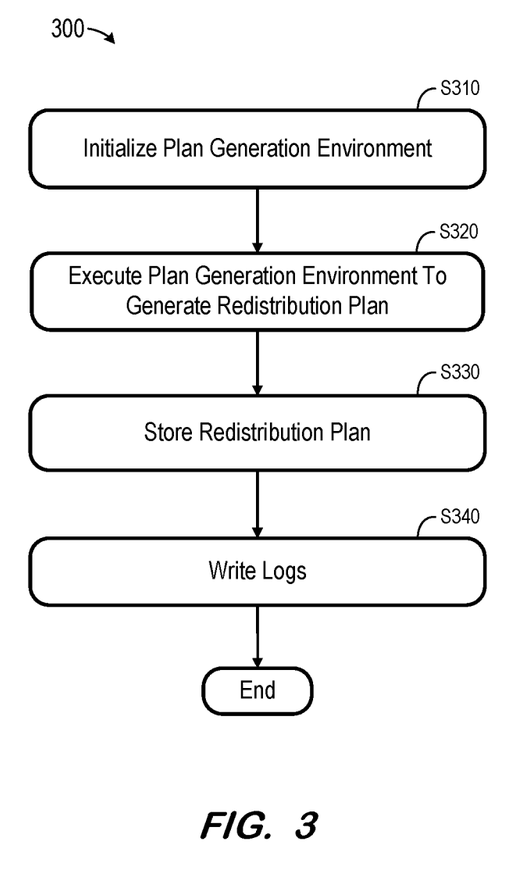
FIG. 3 comprises a flow diagram of a process according to some embodiments.

FIG. 3 comprises a flow diagram of process 300 according to some embodiments. Process 300 may comprise a system to generate a redistribution plan according to some embodiments. In some embodiments, various hardware elements of systems 100 or 200 (e.g., one or more processors) execute program code to perform process 300.

Process 300 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to S310, a user may login to an application for managing a database system. Embodiments may employ any suitable studio, tool, development environment, or other administration application. For example, administrator 240 may operate a client device to access a Web portal of an administration application of database 210. Assuming administrator 240 provides proper credentials, administration tool UI components 230 may transmit a user interface to the client device for display.

Figure 4:
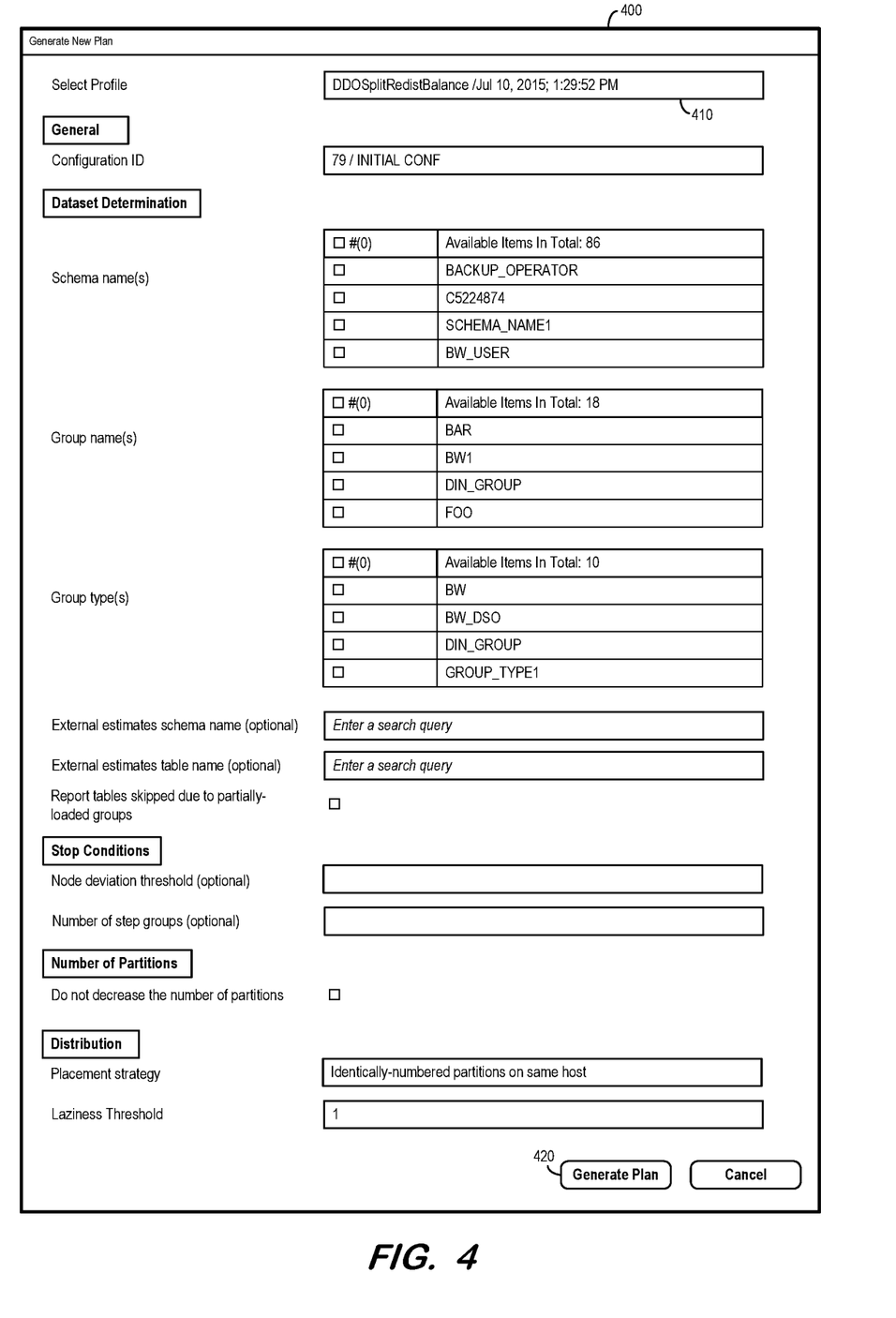
FIG. 4 is an outward view of a user interface according to some embodiments.

FIG. 4 is an outward view of user interface 400 according to some embodiments. Administrator 240 may manipulate user interface 400 to specify plan generation step modules 226 and particular parameters thereof. More specifically, profile field 410 specifies a particular plan generation environment associated with its own module interfaces (i.e., "hooks") and algorithms.

The various sections of interface 400 correspond to different steps of the plan generation environment. A variety of parameters may be specified within each section. For example, the parameters "Schema name(s)", "Group name(s)" and "Group type(s)" are parameters of a module 226 which hooks into a step to determine partition metadata, which will be described below. Process 300 begins upon execution of the Generate Plan user interface control.

At S310, the plan generation steps to be carried out and the modules to be called for each step are determined. Plan generation engine 222 may load configuration settings of module interface data based on the user input described above (i.e., specifying the plan generation environment and the parameters for each step of the environment) and instantiate a plan generation environment based thereon. As described above, a plan generation environment offers one or more predefined hooks that may (or, in some cases, must) be implemented by modules. S310 further comprises loading modules of modules 226 which correspond to the hooks of the instantiated plan generation environment, performing consistency checks and writing message logs.

Next, at S320, and only if the required and identified modules were successfully loaded, the plan generation environment is executed in order to generate a redistribution plan. In some embodiments, plan generation engine 222 may execute the steps of the plan generation environment, invoking the loaded modules as appropriate, to generate a distribution plan. The consistency of the data communicated between engine 222 and the modules is checked against the module interfaces and logs are written providing detailed information on the results of each step. S320 according to some embodiments will be described in detail below with respect to alternative processes 500 and 600 of FIG. 5 and FIG. 6, respectively.

The generated redistribution plan is stored at S330. A redistribution plan consists of redistribution steps, which may contain information on where to move a table partition, or how to change the number of partitions, or may comprise special semantics (e.g., triggering a recompression). These steps may be stored in redistribution plans 216 of repository 212 and may be subsequently executed by database system 205 to redistribute the partitions.

At S340, log messages relating to the plan generation are written to a database table. The log messages may include information on the status of the plan generation and on any problems which occurred. Messages may be set into a relation with any entity (e.g., table), so that a user may identify messages associated with a given entity. Modules may be able to assign different severity levels to log messages, thus facilitating the identification of a root cause of a problem.

Figure 5:
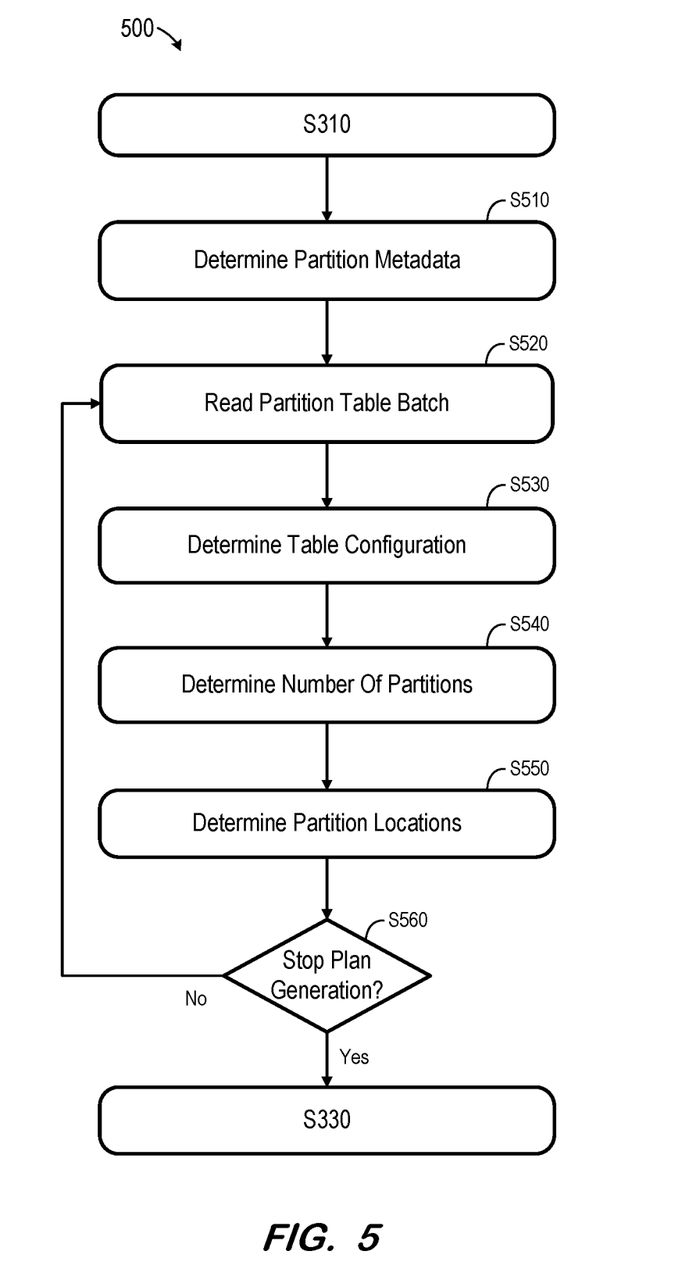
FIG. 5 comprises a flow diagram of a process according to some embodiments.

Process 500 of FIG. 5 comprises an implementation of S320 of process 300 according to some embodiments. Generally, during process 500, plan generation engine 222 carries out particular steps defined by the selected plan generation environment in a predefined order. Logic for performing each step may be provided by the developer of database 205, and customers, consultants or others may overwrite this logic by providing modules embodying their own implementation of the step. Such modules must conform to the interface contract of the step.

Turning to the specific steps, partition metadata is determined at S510. The module implementing this step returns an abstract data source representing the set and metadata of the partitions to be read in the next step. During S510, the set of partitions to be reorganized may be constrained (e.g., by filtering for certain properties) or enriched (e.g., by providing additional metadata, such as sizing estimates, from external sources).

Embodiments may support more than one module executing S510. If more than one module is used, the modules are pipelined with each other such that the data source returned by a first module is passed on as the data source for the second model, and so on. The resulting data source may be a complex nested data source.

Next, at S520, a batch of partition information is read from the abstract data source produced at S510. For example, a module implementing S520 may return groups of tables that exhibit a particular relation with one another (e.g., due to regular database queries using these tables in a join). Tables of the read batch are processed jointly, allowing for larger flexibility (e.g., with regards to placement) for reorganizations. S520 also determines the order in which tables will be processed (e.g., from the largest group with the largest tables to the smallest group with the smallest table). For each table that is part of a batch returned by this module, it is expected that all partitions of the table are returned (i.e., describing a complete table).

The configuration settings of each table of the read batch are determined at S530. It is expected that a configuration is assigned to each table of the batch, and a table is ignored if no associated configuration is found. The configuration attached to a table can be defined by the developer of the application who "owns" the table, but may also be defined by the database administrator or a consultant (i.e., as a "configuration type").

The target number of partitions for each table of the batch is determined at S540 based on the configuration settings. A module implementing S540 may operate per batch, e.g., to make sure that all tables that are part of the batch are assigned a same number of partitions. S540 may be optional in that it can be skipped in case the number of partitions has been defined as fixed.

For each of the partitions contained in the batch, a module implementing S550 determines the host on which the partition should be placed. Any number of factors may be considered in determining which host of a distributed database system is optimal for the given table. For example, the optimal host could be chosen based on a local optimum (e.g., the host with the lowest memory utilization), based on the growth rate of a given table, or to ensure that the number of records of all tables on all hosts is roughly equal.

It is determined at S560 whether to stop generation of the plan. This determination may simply be a determination of whether any more batches of partition metadata remain to be read. If not, flow proceeds to S330 as shown.

S560 may also employ one or more modules which evaluate whether plan generation should be stopped. These modules may be OR'ed together such that plan generation will stop if any module determines that plan generation should be stopped. For example, plan generation could be stopped prematurely (i.e., prior to reading all batches of partition metadata) if the table partitions are already known to be distributed correctly and it is detected that the overall node utilization is sufficiently balanced. Other factors for determining whether to stop plan generation include but are not limited to the number of hosts, overall memory distribution across the hosts, the processor load caused by reading or modifying data of different table partitions which belong together, and the time required to execute a redistribution plan.

If the determination at S560 is negative, flow returns to S520 to read a next batch of partition metadata and continues as described above until all batches are read and a redistribution plan is generated or it is otherwise determined to stop plan generation at S560.

Figure 6:
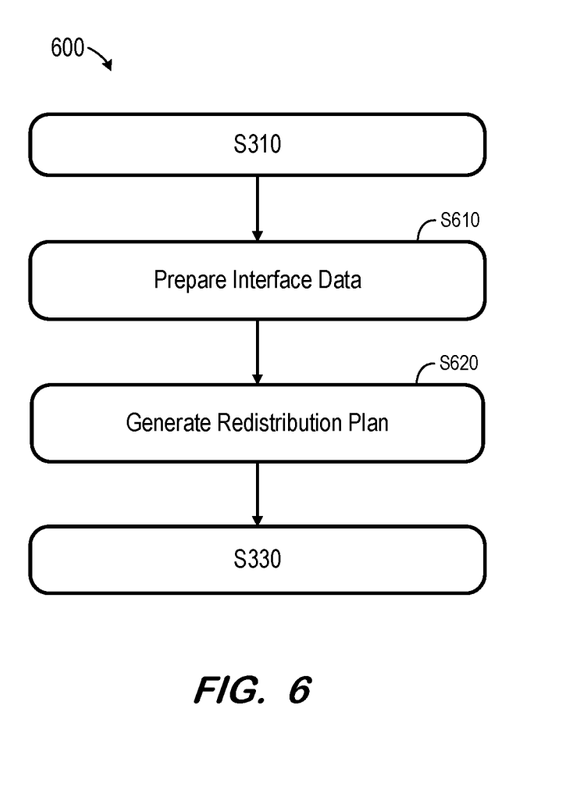
FIG. 6 comprises a flow diagram of a process according to some embodiments.

Process 600 of FIG. 6 illustrates an implementation of S320 according to some embodiments. Process 600 reflects a plan generation environment in which a redistribution plan is generated within one step based on parameters defined by a database administrator. Accordingly, rather than utilizing modules which customize associated sub-steps of redistribution plan generation as described with respect to process 500, a module to plug into the plan generation environment of process 600 provides an implementation of the full algorithm for generating the redistribution plan.

At S610, the data provided by the database administrator (e.g., by database administrator 240 via interface 400) is conformed to the (sole) module interface of the plan generation environment. Next, at S620, the module generates a distribution plan based on the configuration data of the plan generation environment and the data provided by the database administrator. Flow then continues to S330 as described above.

The foregoing modularization concept facilitates, via well-defined interfaces and invocation capabilities, the use of plug-in modules which provide functionality to influence the generation of redistribution plans which, for example, define database table partitions and their placement on hosts of a distributed database system.

Figure 7:
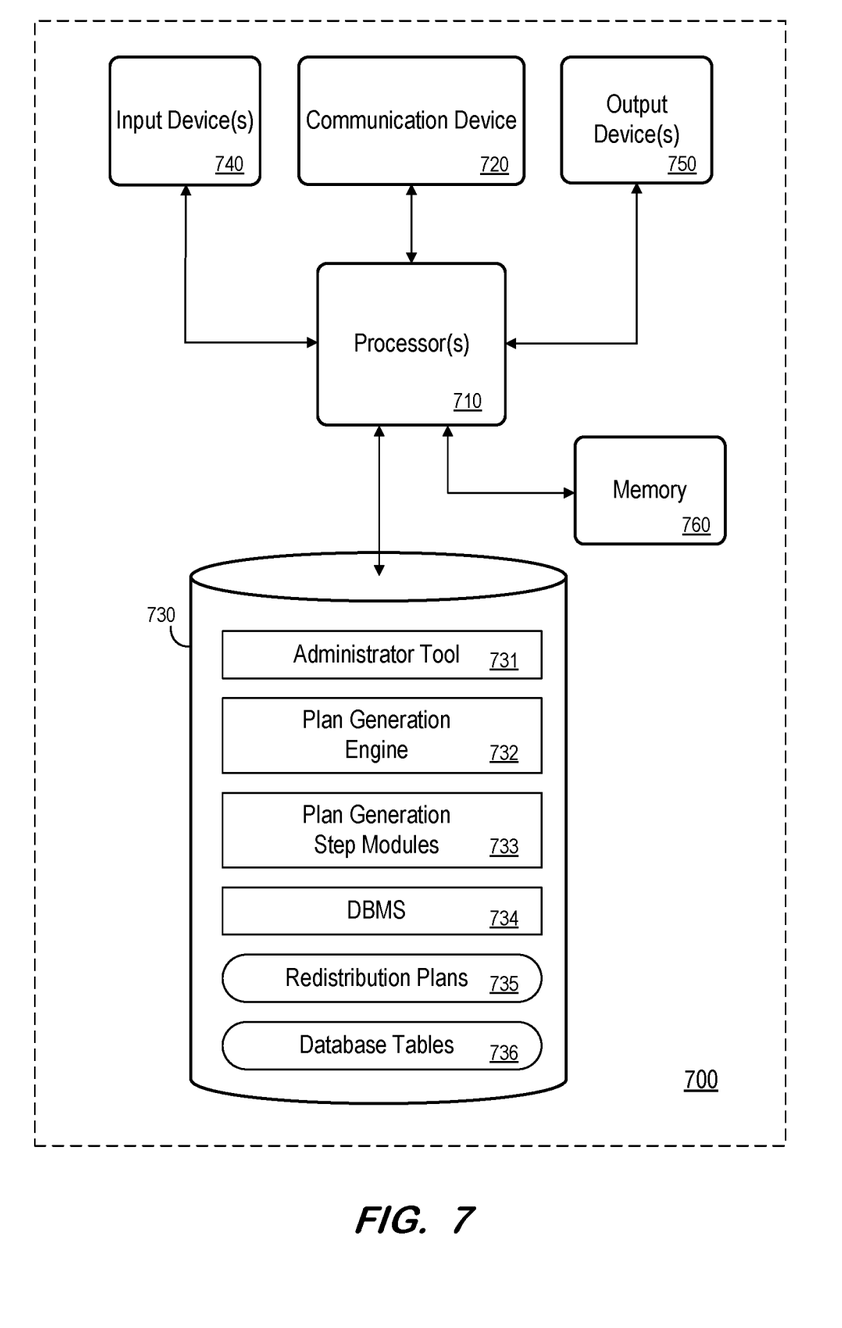
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. According to some embodiments, apparatus 700 may comprise an implementation of database 110 and application server 110 of FIG. 1 and/or database system 205 of FIG. 2. Apparatus 700 may include other unshown elements.

Apparatus 700 includes processor 710 operatively coupled to communication device 720, data storage device 730, one or more input devices 740, one or more output devices 750 and memory 760. Communication device 720 may facilitate communication with external devices, such as a client, or an external data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Administrator tool 731, plan generation engine 732, plan generation step modules 733 and DBMS 734 may comprise program code executed by processor 710 to cause apparatus 700 to perform any one or more of the processes described herein. Embodiments are not limited to execution of these processes by a single apparatus.

Redistribution plans 735 may be generated by plan generation engine 732 in conjunction with plan generation step modules 733 as described herein. Database tables 736 may comprise database tables storing data, as well as metadata and any other data desired to be stored. Redistribution plans 735 may be executed to distribute partitions of database tables 736 among hosts as is known in the art.

Database tables 736 may be stored in device 730 as shown and/or in volatile memory such as memory 760. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a memory storing processor-executable process steps; and
    a processor to execute the processor-executable process steps to cause the system to:
    receive, via a user interface, user input specifying a profile of a plan generation environment, wherein the plan generation environment is associated with its own one or more module interfaces that are to be used and defining parameters of each of the one or more module interfaces, each of the one or more module interfaces associated with a respective one of a plurality of software steps to be performed for generating a database table partition redistribution plan that defines database table partitions and locations of the database table partitions on multiple database hosts, wherein the plurality of software steps comprises:
    determining a plurality of database table partitions;
    for each of a first subset of the plurality of database table partitions, determining a first plurality of associated database tables;
    determining a number of partitions for each of the first plurality of associated database tables;
    determining a location on one of a plurality of database hosts for each of the number of partitions of each of the first plurality of associated database tables; and
    determining to stop generation of the database table partition redistribution plan via a stoppage step, wherein the system executes the plan generation environment and one or more plan generation step modules associated with the stoppage step to determine to stop generation of the database table partition redistribution plan; and
    determine the one or more plan generation step modules for each plan generation step based on the plan generation environment;
    instantiate a plan generation environment based on the user input received, exposing the one or more module interfaces;
    identify, for the one or more module interfaces, an associated one or more plan generation step modules for performing the software step associated with the at least one module interface; and
    execute the plan generation environment and the identified one or more plan generation step modules to generate the database table partition redistribution plan, wherein a first one of the plan generation step modules determines partition metadata from a data source and a second one of the plan generation step modules reads a batch of partition information from the data source and groups the batch of partition information into groups of tables that exhibit a relation with one another and determines an order in which the groups of tables will be processed;
    wherein the two or more plan generation step modules are identified for performing the step of determining the plurality of database table partitions, and wherein execution of the step of determining the plurality of database table partitions comprises pipelining the two or more plan generation step modules.

2. The system according to claim 1, the processor to further execute the processor-executable process steps to cause the system to:
    execute the database table partition redistribution plan to distribute each of the number of partitions of each of the first plurality of associated database tables to its determined location.

3. The system according to claim 1, wherein the user interface includes a plurality of sections and each section corresponds to one of the steps of the plan generation environment.

4. The system according to claim 1, further comprising process steps to cause the system to:
    load configuration settings of module interface data based on the received user input.

5. The system according to claim 1, further comprising process steps to cause the system to:
    log data describing each of the executed software steps.

6. The system according to claim 5, further comprising process steps to cause the system to:
    store the generated database table partition redistribution plan; and
    store the logged data.

7. The system according to claim 1, wherein the step of determining the plurality of database table partitions further comprises one of constraining the plurality of database table partitions or enriching the plurality of database table partitions.

8. A computer-implemented method comprising:
    receiving, via a user interface, user input specifying a profile of a plan generation environment, wherein the plan generation environment is associated with its own one or more module interfaces that are to be used and defining parameters of each of the one or more module interfaces, each of the one or more module interfaces associated with a respective one of a plurality of software steps to be performed for generating a database table partition redistribution plan that defines database table partitions and locations of the database table partitions on multiple database hosts, wherein the plurality of software steps comprises:
        determining a plurality of database table partitions;
        for each of a first subset of the plurality of database table partitions, determining a first plurality of associated database tables;
        determining a number of partitions for each of the first plurality of associated database tables;
        determining a location on one of a plurality of database hosts for each of the number of partitions of each of the first plurality of associated database tables; and
        determining to stop generation of the database table partition redistribution plan via a stoppage step,
    executing the plan generation environment and one or more plan generation step modules associated with the stoppage step to determine to stop generation of the database table partition redistribution plan; and
    determining the one or more plan generation step modules for each plan generation step based on the plan generation environment;
    instantiating a plan generation environment based on the user input received, exposing the one or more module interfaces;
    identifying, for the one or more module interfaces, an associated one or more plan generation step modules for performing the software step associated with the at least one module interface; and
    executing the plan generation environment and the identified one or more plan generation step modules to generate the database table partition redistribution plan, wherein a first one of the plan generation step modules determines partition metadata from a data source and a second one of the plan generation step modules reads a batch of partition information from the data source and groups the batch of partition information into groups of tables that exhibit a relation with one another and determines an order in which the groups of tables will be processed; wherein the two or more plan generation step modules are identified for performing the step of determining the plurality of database table partitions, and wherein execution of the step of determining the plurality of database table partitions comprises pipelining the two or more plan generation step modules.

9. The method according to claim 8, further comprising:
    executing the database table partition redistribution plan to distribute each of the number of partitions of each of the first plurality of associated database tables to its determined location.

10. A non-transitory computer-readable medium storing program code, the program code executable by a computer system to cause the computer system to:
    receive, via a user interface, user input specifying a profile of a plan generation environment, wherein the plan generation environment is associated with its own one or more module interfaces that are to be used and defining parameters of each of the one or more module interfaces, each of the one or more module interfaces associated with a respective one of a plurality of software steps to be performed for generating a database table partition redistribution plan that defines database table partitions and locations of the database table partitions on multiple database hosts, wherein the plurality of software steps comprise:
        determining a plurality of database table partitions;
        for each of a first subset of the plurality of database table partitions, determining a first plurality of associated database tables;
        determining a number of partitions for each of the first plurality of associated database tables;
        determining a location on one of a plurality of database hosts for each of the number of partitions of each of the first plurality of associated database tables; and
        determining to stop generation of the database table partition redistribution plan via a stoppage step, wherein the system may execute the plan generation environment and one or more plan generation step modules associated with the stoppage step to determine to stop generation of the database table partition redistribution plan; and
    determine the one or more plan generation step modules for each plan generation step based on the plan generation environment;
    instantiate a plan generation environment based on the user input received, exposing the one or more module interfaces;
    identify, for the one or more module interfaces, an associated one or more plan generation step modules for performing the software step associated with the at least one module interface; and
    execute the plan generation environment and the identified one or more plan generation step modules to generate the database table partition redistribution plan, wherein a first one of the plan generation step modules determines partition metadata from a data source and a second one of the plan generation step modules reads a batch of partition information from the data source and groups the batch of partition information into groups of tables that exhibit a relation with one another and determines an order in which the groups of tables will be processed;

wherein the two or more plan generation step modules are identified for performing the step of determining the plurality of database table partitions, and wherein execution of the step of determining the plurality of database table partitions comprises pipelining the two or more plan generation step modules.

11. The medium according to claim 10, the program code further executable by a computer system to cause the computer system to:

execute the database table partition redistribution plan to distribute each of the number of partitions of each of the first plurality of associated database tables to its determined location.

\* \* \* \* \*